April 8, 1958   V. G. SHARPE   2,829,506
ICE BLOCK HARVESTING DEVICE
Filed July 11, 1956   3 Sheets-Sheet 1
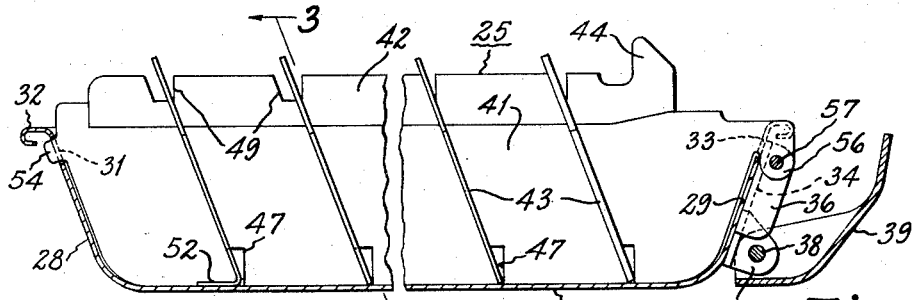
Fig. 2.
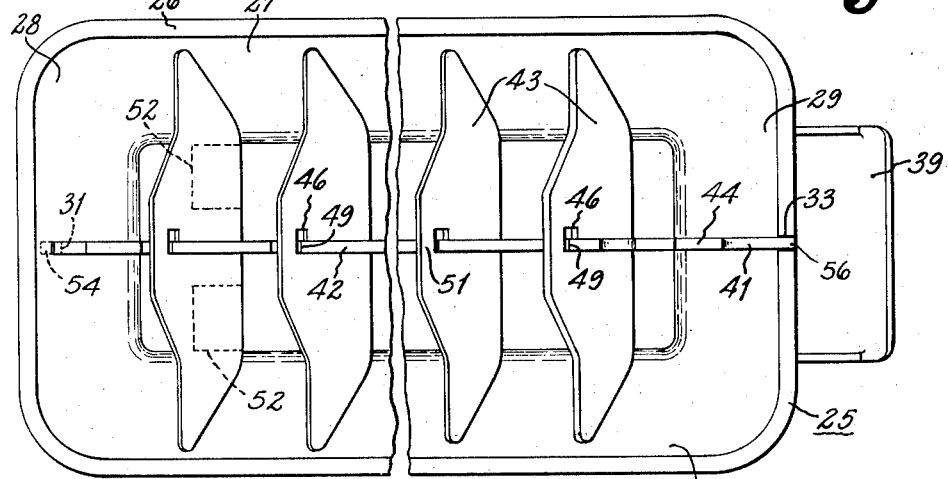
Fig. 4.
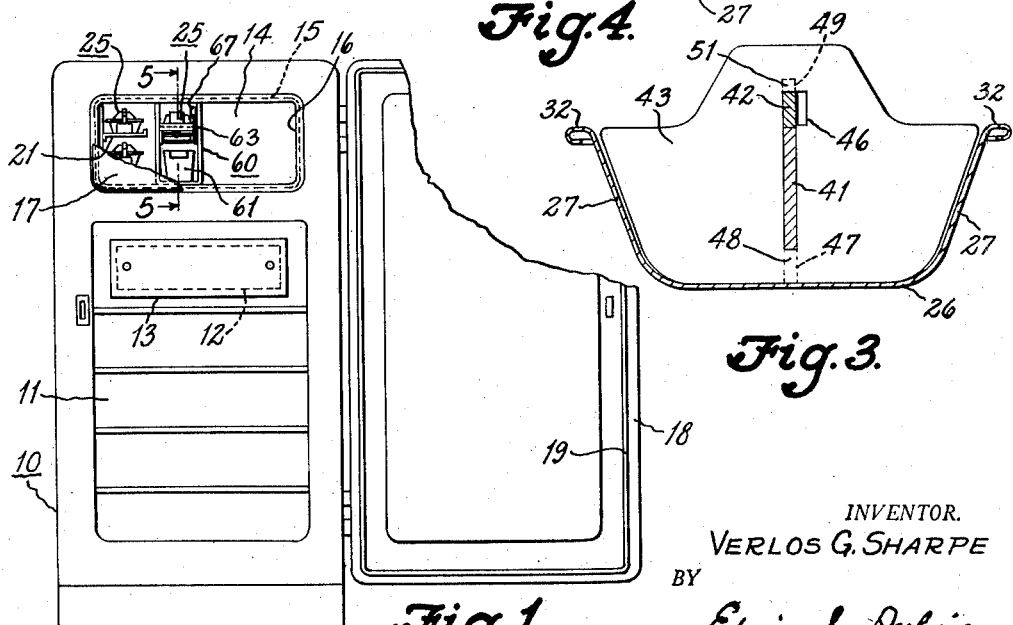
Fig. 3.
Fig. 1.
INVENTOR.
VERLOS G. SHARPE
BY
Edwin S. Dybvig
ATTORNEY

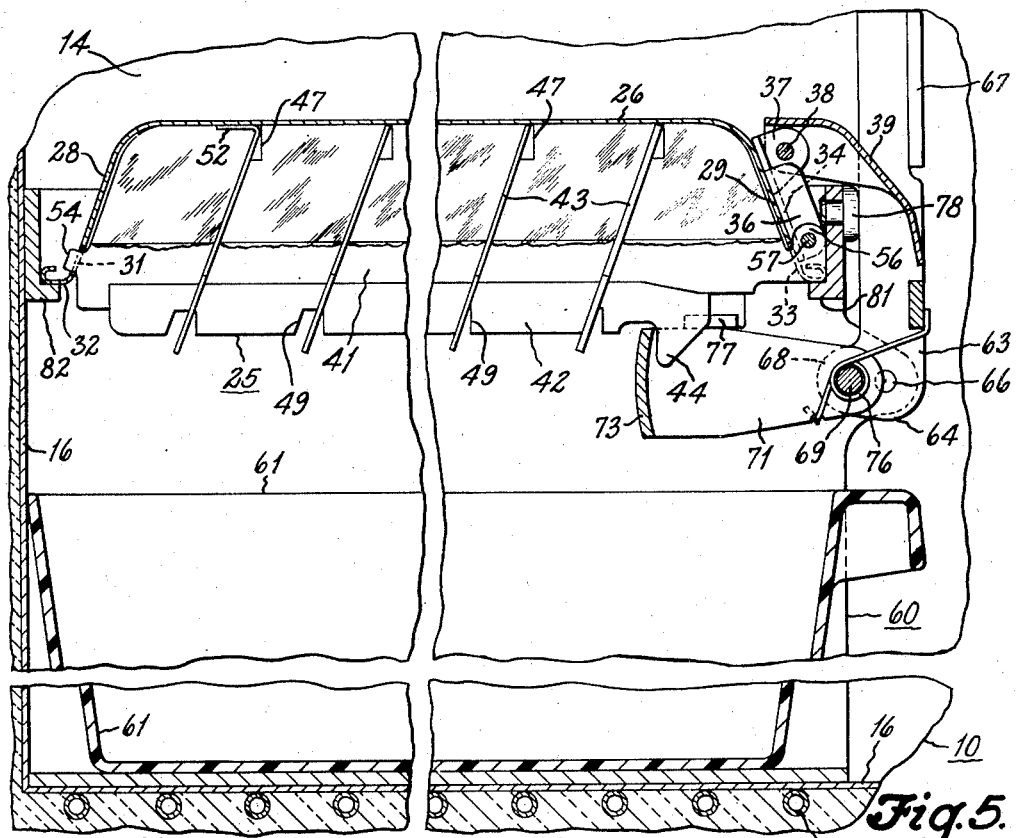
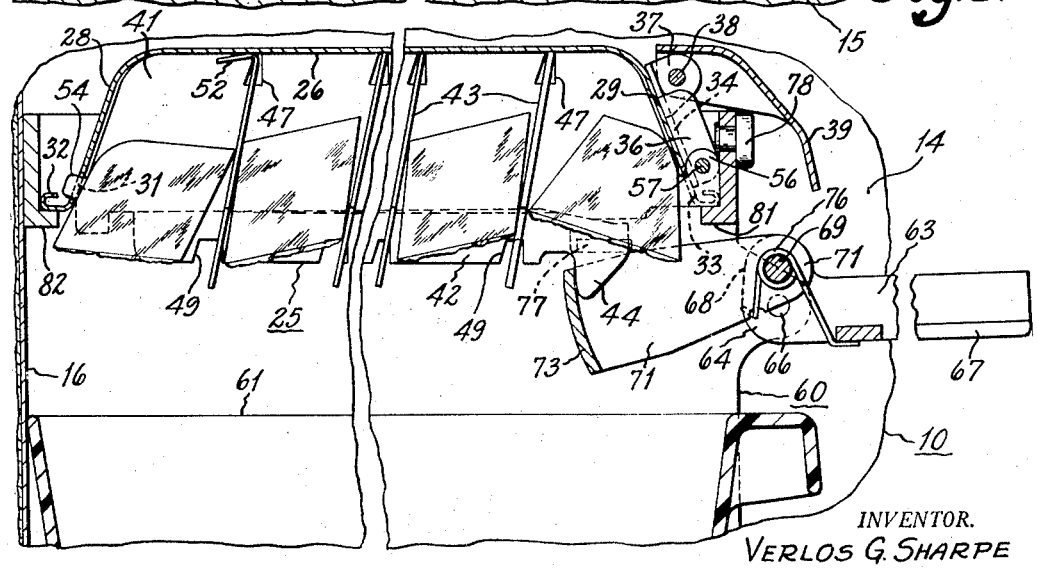

April 8, 1958 V. G. SHARPE 2,829,506
ICE BLOCK HARVESTING DEVICE
Filed July 11, 1956 3 Sheets-Sheet 3

INVENTOR.
VERLOS G. SHARPE
BY
Edwin S. Dybvig
ATTORNEY

United States Patent Office 2,829,506
Patented Apr. 8, 1958

2,829,506

ICE BLOCK HARVESTING DEVICE

Verlos G. Sharpe, Dayton, Ohio, assignor to General Motors Corporation, Detroit, Mich., a corporation of Delaware Application July 11, 1956, Serial No. 597,213

3 Claims. (Cl. 62—106)

This invention relates to refrigeration and particularly to an arrangement for harvesting ice blocks from freezing devices.

My invention has to do with an improvement in the refrigeration art and specifically an improvement over the ice block ejecting device disclosed in the copending application of Arthur J. Frei, S. N. 576,128 filed April 4, 1956, now Patent No. 2,809,499 and assigned to the assignee of the present application. There is disclosed in this assignee's copending Frei application unitary freezing devices of the type including a tray and a movable walled grid locked in the tray against detachment or removal therefrom. Each of the freezing devices has a force multiplying leverage mechanism thereon for moving grid walls therein relative to one another while the grid remains locked in the tray for releasing ice blocks. The provision of a leverage mechanism on a freezing device requires parts thereof to be constructed of relatively thick heavy metal pieces in order that the device itself will withstand the reaction forces imparted thereto upon moving the mechanism and this together with the provision of a mechanism on each such freezing device greatly increases the cost of manufacturing same. I, therefore, contemplate the provision of a single force multiplying leverage mechanism which is separate from and yet common to all the freezing devices employed in conjunction with the use of a household refrigerator cabinet and receives any selected one of the plurality of freezing devices for operation thereon to release ice blocks therefrom whereby to eliminate the expense of furnishing each of the individual freezing devices with a leverage mechanism.

An object of my invention is to provide an improved and low cost arrangement for releasing ice blocks from a plurality of freezing devices which arrangement is capable of use in association with or proximity to the refrigerator containing the devices.

Another object of my invention is to provide a manually actuated force multiplying mechanism on a support arrangement for receiving and supporting any selected one of a plurality of freezing devices of the type including a grid locked in a tray and walls of which grid are tiltable relative to one another and to the tray while the grid remains locked therein and when the tray is supported in an inverted position on the support element.

A further object of my invention is to hold the tray of a unitary freezing device including a tray and a movable walled grid structure locked therein against removal therefrom in an inverted stationary position on a suitable freezing device receiving and supporting element while a mechanism on and movable relative to the element is operated to tilt substantially inflexible metal walls of the grid from an acute inclined angular position toward the vertical for breaking bonds between the grid walls and ice blocks in the device and for enlarging the ice block compartments to release ice blocks therefrom.

In carrying out the foregoing objects it is a still further and more specific object of my invention to provide a mechanism on a support element with a movable part which receives a part of an actuating member of any one of a plurality of similar or companion freezing devices when a device is supported in an inverted position on the support to removably interlock said parts together whereby the actuating member is shifted relative to the tray of the device upon operating the mechanism for engaging and tilting walls of a grid locked in the tray of the freezing device for releasing ice blocks therefrom without distorting or twisting the tray.

Further objects and advantages of the present invention will be apparent from the following description, reference being had to the accompanying drawings, wherein a preferred form of the present invention is clearly shown.

In the drawings:

Figure 1 is a front view of a multiple chambered household refrigerator cabinet with the main door open and a part of the freezing chamber door broken away showing a freezing device support and an ice block storage receptacle therebelow constructed in accordance with my invention in the chamber;

Figure 2 is a broken view of a unitary tray and grid freezing device with the tray in section showing means for locking the grid in the tray against removal therefrom;

Figure 3 is a sectional view taken on the line 3—3 of Figure 2 showing transverse walls of the grid of the freezing device movably interlocked with a longitudinal partition therein;

Figure 4 is a broken top view of the unitary freezing device;

Figure 5 is an enlarged fragmentary sectional view taken on the line 5—5 of Figure 1 showing a unitary freezing device invertedly supported on the support in the freezing chamber of the refrigerator cabinet with a part of the actuating member of the grid in the device removably interlocked with a force multiplying leverage mechanism associated with the support;

Figure 6 is a view similar to Figure 5 and shows the lever of the mechanism rotated into a position which breaks bonds between the grid walls and ice blocks in the freezing device;

Figure 7:
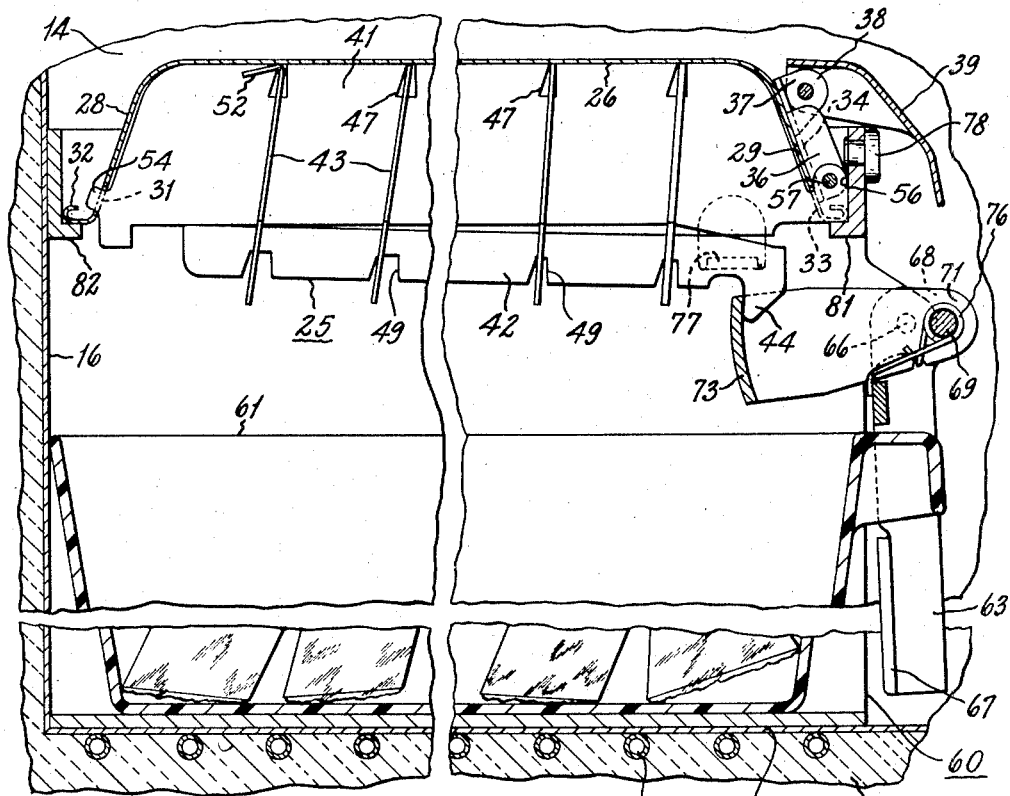
Figure 7 is a view similar to Figures 5 and 6 showing the lever of the mechanism further rotated into a position which tilts the transverse walls of the grid locked in the tray of the freezing device into a position to enlarge the ice block compartments and release ice blocks therefrom.
Figure 8:
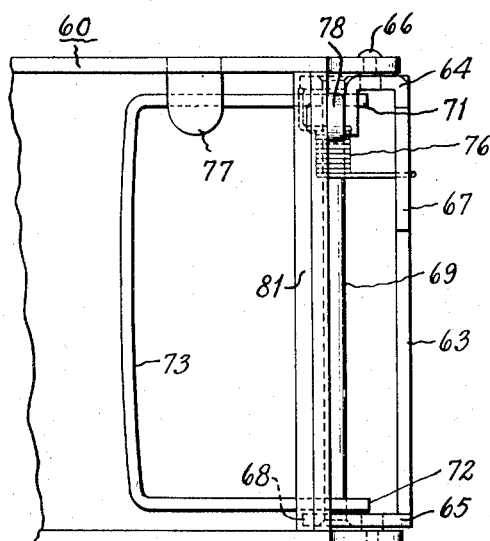
Figure 8 is a top view of the ice block releasing mechanism on the freezing device support.

Referring to the drawings, for illustrating the invention, I show in Figure 1 thereof a refrigerating apparatus including an insulated household refrigerator cabinet 10 of the multiple compartment or chamber type in which the present invention is incorporated. Cabinet 10 is provided with a lower unfrozen food storage chamber or compartment 11 which is cooled to a temperature of from, for example, 37° F. to 43° F., by a plate-like sheet metal evaporator 12 of a refrigerating system associated with the cabinet and located behind a protecting cover or baffle 13. Cabinet 10 is also provided with an upper or frozen food storage chamber or compartment 14 which is cooled to a temperature well below 32° F. for the storage of frozen foods, for freezing foods and/or for freezing water in freezing devices removably disposed in chamber 14 into ice blocks for table use in chilling salads or the like and drinks in glasses. Chamber 14 is refrigerated by an evaporator 15, of the refrigerating system associated with cabinet 10, which evaporator is in the form of a conduit coiled or wrapped around the outside of and secured to a metal can-like member 16 forming the liner of chamber 14 (see Figures 1, 5, 7). A door 17, shown broken away in Figure 1, is hingedly mounted at the front of chamber 14 to provide an individual closure for the access opening thereof as is conventional in the art. Another insulated main door structure 18, hingedly mounted on cabinet 10 for horizontal swinging movement relative thereto, extends across the front of both chambers 11 and 14 and is provided with a resilient gasket 19 for sealingly engaging the front side of cabinet 10. A plurality of vertically spaced apart shelves 21 are secured, in any suitable or desirable manner, directly to a side wall of liner 16 of chamber 14 so as to be in metal to metal contact therewith and consequently with evaporator 15. Each shelf 21 is adapted to support, in an upright position, a unitary freezing device, generally represented by the reference numeral 25 in Figure 1, and shown more clearly in other figures of the drawings.

Each of the unitary freezing devices 25 include an elongated sheet metal pan or tray 26 provided with a bottom, outwardly inclined sides 27 and ends 28 and 29 (see Figures 2, 3 and 4). The rear end 28 of the tray 26 is provided with an opening 31 adjacent a top rim 32 provided around the tray and the other or the front end 29 of tray 26 is notched out as at 33 (see Figure 2). This notch 33 extends downwardly through rim 32 to a short distance therebelow for a purpose to be presently described. Two opposed brackets 34 are welded to the front end 29 of tray 26 one on each side of notch 33. Each bracket 34 has an outwardly projecting flange 36 and another outwardly projecting flange 37 thereon spaced from flange 36. The flanges 37 are provided with an opening which receives a rivet or stud 38 extending through a leg of a substantially U-shaped cam handle lever 39. Cam handle 39 serves as a cam or lever for prying the bottom of a tray 26 upwardly loose from a freezing support or shelf 21 when a freezing device 25 is to be removed from chamber 14 as is common in the art. A movable walled grid structure is locked in tray 26 against removal therefrom and, the grid together with the tray form one of the plurality of unitary freezing devices 25. The grid structure in a device 25 includes a two-part metal longitudinal wall or partition and a plurality of spaced apart metal walls extending transversely of the longitudinal partition for dividing the interior of tray 26 into rows of ice block forming compartments in which water is to be frozen into separate blocks. The longitudinal partition of the grid structure comprises a lower wall 41 and an upper actuating wall or member 42 disposed in vertical alignment therewith and adapted to be moved back and forth therealong. The plurality of longitudinally spaced apart metal cross walls 43 are substantially inflexible, are loosely mounted on the lower wall 41 of the partition at their bottom edges and upon the actuating wall or member 42 adjacent their upper edges. Cross walls 43 are mounted in such a manner that they may be swung or tilted relative to the lower wall 41 of the longitudinal partition and to tray 26. Cross walls 43 are normally disposed or lie in an acute inclined angular plane with respect to the vertical and are adapted to be tilted into a substantially vertical plane when the actuating member 42 is moved lengthwise along wall 41. It is to be noted that actuating member 42 is provided with a hook-like end 44 at the front of a device 25 and this hook 44 is for a purpose to be described hereinafter. By virtue of the normal inclined freezing position of cross walls 43 the ice block forming compartments are, in one vertical cross sectional contour or area therethrough, of a parallelogram shape and when the walls 43 are tilted toward the vertical to break bonds between walls of the compartments and ice blocks therein, these compartments are enlarged in a direction intermediate the walls 43. This feature is old in the art being fully described and explained in the Don H. Reeves Patent #2,219,079 dated October 22, 1940 and in other patents and greatly contributes to the success of the present invention in permitting release of ice blocks from a tray without elevating or moving the grid structure as a unit relative to the tray.

Cross or transverse grid walls 43 each have an elongated keyhole-shaped opening 46 therein (see Figure 3) through which the walls 41 and 42 of the longitudinal partition extend. The opening 46 in cross walls 43 is so shaped as to permit insertion of the lower wall 41 and the upper wall or actuating member 42 into the opening 46 of the various cross walls 43 one after the other respectively during assembly of parts of the grid structure whereby the wall 42 can be moved above wall 41 while this wall extends through the opening 46 so as to loosely rest on the lower wall 41. Lower wall 41 has a series of notches 47 cut in its bottom edge to loosely receive a short web portion 48 at the bottom margin of cross walls 43 (see Figure 3). The actuating wall or member 42 has notches 49 of varying width cut therein and suitably spaced apart along the upper edge thereof to receive continuous or web portions 51 of the cross walls 43. The notches 49 in member 42 are so differently arranged that edge portions thereof engage the cross or transverse partitions 43 one after the other in succession from the front to the rear of a freezing device 25, when member 42 is shifted relative to wall 41, to permit tilting of the walls 43 and to also progressively enlarge the ice block compartments as is conventional in the art. The method of assembling the grid walls 41, 42, 43 into interlocked relative movable association with one another as herein depicted is now well known to those skilled in the art. It is to be noted that the cross wall 43 at the front of a device 25 is thicker than other of the walls 43 and that the wall 43 at the rear end of the device is provided with a lip 52 at its lower edge. The thicker front cross wall aborbs the brunt of force adapted to be applied to the grid to move walls thereof and the lip 52 facilitates releasing and ejection of the pairs of ice blocks at the rear end of the device 25. Any suitable means or arrangement may be provided to keep the walls 41 and 42 in vertical alignment with one another when relative movement occurs between them. The lower wall 41 of the longitudinal partition of the grid structure is provided at the rear end of device 25 with a projection 54 fitting in the closed walled opening 31 of tray end wall 28. The other or forward end of wall 41 is provided with a punctured ear 56 which is slid into notch 33 at the front end 29 of device 25 and is secured to the flange 36 on brackets 34 by a pin or rivet 57. Since the walls 41, 42, 43 are all movably interlocked together the grid structure is locked against removal from tray 26 by the projection 54 and ear 56 to form a freezing device 25 which is devoid of a leverage mechanism or the like as has heretofore been customary. Any number of similar freezing devices 25 may be located in the chamber 14 of cabinet 10.

In accordance with my invention I provide a single force multiplying mechanism for acting upon any selected one of the several similar or companion freezing devices 25 within chamber 14 of the refrigerator cabinet 10, to move the movable walls therein and release ice blocks therefrom. The mechanism is, in the present disclosure, mounted on a freezing device receiving and supporting element preferably, although not necessarily, located in the freezing chamber 14. This element includes a substantially U-shaped metal wall structure, generally represented at 60 in Figure 1, with the bight portion intermediate legs thereof supported on the bottom wall of chamber 14. A receptacle 61 is removably disposed in chamber 14 and rests on the supporting bight portions of U-shaped wall structure 60 for receiving and storing ice blocks released from a freezing device 25 in a manner to be presently described. The mechanism includes a lever 63 having forked ends 64 and 65 pivotally mounted adjacent the upper extremity of legs of U-shaped wall structure 60 by studs 66. Lever 63 has a handle portion 67 at its end opposite the ends 64 and 65 thereof. Ends 64 and 65 of lever 63 are each provided with an offset portion 68 having a hole therein receiving and supporting a shaft 69 which extends across the interior of the structure 60 and is swingable relative thereto about the axis of the lever mounting studs 66. This shaft 69 carries legs 71 and 72 of a yoke 73 which forms a movable part of the force multiplying mechanism adapted to be engaged by and removably interlocked with a part of the actuating member 42 of a device 25. A spring 76 coiled about shaft 69 has one end thereof bearing against the forked end of lever 63 and has its other end bearing against the leg 71 of yoke 73. This spring 76 normally forces the yoke 73 against a stop 77, cut and bent inwardly of one of the legs of the U-shaped wall structure 60, and lever 63 against a resilient bumper or stop 78 mounted on one of two brackets to be presently described. Brackets secured to and extending across the upper part of legs of U-shaped element 60 at the front and rear thereof have ledges 81 and 82 thereon respectively. The ledges 81 and 82 form on the freezing device receiving U-shaped wall structure or element 60 a horizontal support for supporting a freezing device 25 thereon. Downward rotation of lever 63, relative to the freezing device receiving and supporting element 60, about its pivotal mounting studs 66, will swing the shaft 69 around the axis of the studs 66 and in so swinging also moves the yoke 73 laterally or in a horizontal direction. Rotary movement of lever 63 of the force multiplying means from its normal upper or vertical position to a lower substantially vertical position swings shaft 69 from one side of the lever mounting studs 66 to the other side thereof and consequently moves the yoke 73 a predetermined distance in a horizontal direction. This movement of yoke 73 is utilized to tilt the inclined transverse substantially inflexible metal walls 43 of a freezing device 25, invertedly supported upon the element 60, toward the vertical for releasing ice blocks therefrom, as will hereinafter be described.

After water has been hard-frozen into separated ice blocks in the upright freezing devices 25, on shelves 21 within the frozen food storage and freezing chamber 14 of the refrigerator cabinet 10, any selected one of the unitary freezing devices together with the grid and ice blocks therein is removed from a shelf, rotated into an inverted position and placed upside down on element 60 with end portions of the rim 32 on tray 26 resting on the supporting ledges 81 and 82. When the device is so received by element 60, hook 44 on the actuating wall member 42 of the grid fits over or may be removably interlocked with the yoke 73 of the force multiplying mechanism on element 60 (see Figure 5). Portions of the brackets on walls of element 60 are abutted by the outer edge of rim 32 on tray 26 of the inverted device 25 and these portions of the freezing device receiving and supporting element form means for holding the tray of an inverted device 25 on element 60 stationary while the force multiplying leverage mechanism is being operated. In order to release ice blocks from the inverted freezing device 25 on element 60 the handle 67 of lever 63 is grasped by a hand of an operator and pulled outwardly and downwardly relative to the element 60. The forked lever ends 64 and 65 rotate about studs 66 and offset portions 68 on these ends of lever 63 swing or rotate shaft 69 in an arc around the axis of studs 66. This, in addition to compressing spring 76, moves the yoke 73 laterally, since the hook 44 on actuating member 42 of the inverted device is interlocked with or is in front of yoke 73, to shift member 42 forwardly along grid wall 41 to cause edge portions of the notches 49 therein to engage and tilt the walls 43 one after the other in succession toward the vertical. The tilting of cross walls 43 progressively breaks bonds between these walls, walls of tray 26 and ice blocks in the device to free ice blocks therefrom and enlarges the ice block compartments to release the freed separated ice blocks from the inverted freezing device 25 whereupon the released ice blocks fall into the storage receptacle 61. The pair of ice blocks at the forward end of the inverted device 25 may hang upon or temporarily be prevented, by yoke 73, from falling into receptacle 61. However, just as soon as lever 63 is released to permit same and yoke 73 to return to their normal position this pair of ice blocks will drop into the storage receptacle. In Figure 6 of the drawings I show lever 63 of the force multiplying mechanism rotated through an arc of 90° to illustrate the breaking of bonds between walls of the inverted freezing device 25 and ice blocks therein. In Figure 7 of the drawings I show lever 63 of the force multiplying mechanism rotated through an arc of approximately 180° for illustrating enlargement of the ice block compartments intermediate walls 43, and the release of the freed ice blocks from the freezing device. Upon moving lever 63 to the position shown in Figure 7 of the drawings spring 76 is further compressed and increases energy stored up therein whereby this spring returns the lever 63 and yoke 73 to their normal positions as shown in Figure 5 of the drawings after the operator releases the lever.

By providing a single force multiplying mechanism which receives any selected one of the plurality of unitary freezing devices within a refrigerator cabinet for harvesting ice blocks therefrom I have eliminated the expense of incorporating such a mechanism on each and every one of a plurality of freezing devices furnished with a household refrigerator. The arrangement herein disclosed releases ice blocks without distorting or twisting the tray and consequently avoids the hazard of a tray of a freezing device taking a permanent twisted set position after prolonged twisting operations have been performed thereon. In the freezing devices herein disclosed the grid structure remains locked in the tray thereof and eliminates a grid being misplaced relative to the tray. While I have disclosed a grid structure having a single longitudinal partition it is to be understood that other grids provided with a plurality of longitudinal partitions can be employed in conjunction with a single force multiplying mechanism common to a plurality of freezing devices. It is to be understood that the freezing device receiving and supporting element with the mechanism movably associated therewith may be mounted or supported on any part of the refrigerator cabinet or that it can be removed therefrom if desired and ice blocks harvested from freezing devices at a kitchen work ledge or the like.

While the form of embodiment of the invention as herein disclosed constitutes a preferred form, it is to be understood that other forms might be adopted, as may come within the scope of the claims which follow.

What is claimed is as follows:

1. In combination, a refrigerator cabinet having a chamber therein, a refrigerating system associated with said cabinet including an evaporator for cooling said chamber to a temperature below 32° F., a unitary freezing device normally disposed in said chamber, a freezing device receiving and supporting element associated with said cabinet, said unitary freezing device comprising an elongated metal tray and a grid structure locked in said tray against removal therefrom, said grid structure including a plurality of substantially inflexible movable walls separate from and independent of walls of the tray spaced apart along the length thereof and inclined with respect to the vertical, said grid structure also including an actuating member extending along the length of said tray across said plurality of inclined walls and adapted to engage and tilt same while the grid remains locked in the tray, said grid walls dividing the interior of said tray into compartments in which water is to be frozen into separated ice blocks, a force multiplying mechanism separate from and independent of said unitary freezing device, said force multiplying mechanism being mounted on said freezing device receiving and supporting element for movement relative thereto, said freezing device together with said grid and ice blocks therein being removable from said chamber, rotatable into an inverted supported position on said element with a part of said actuating member removably registering and interlocked with a movable part of said mechanism, said mechanism being operable through said interlocked parts for shifting said actuating member lengthwise along the tray of said inverted supported freezing device to tilt said inclined grid walls relative to said tray toward the vertical whereby said compartments are enlarged and ice blocks are released from the device without twisting the tray thereof, and fixed means associated with said support element for holding the tray of said inverted freezing device stationary thereon against being moved longitudinally thereof during operation of said mechanism.

2. The combination defined by claim 1 wherein the actuating member engages the inclined grid walls one after the other in succession to progressively tilt same from end to end of the freezing device.

3. The combination defined by claim 1 wherein a receptacle is removably disposed below the freezing device support on the freezing device receiving element and receives ice blocks released from the device.

References Cited in the file of this patent

UNITED STATES PATENTS

| | | |
|---|---|---|
| 1,954,224 | Piker | Apr. 10, 1934 |
| 1,958,392 | Hofferberth | May 8, 1934 |
| 2,113,014 | Copeman | Apr. 5, 1938 |
| 2,217,681 | Jennings | Oct. 15, 1940 |
| 2,261,952 | Blomquist | Nov. 11, 1941 |
| 2,342,860 | Hedlund | Feb. 29, 1944 |
| 2,429,882 | Jennings | Oct. 28, 1947 |
| 2,587,233 | Schweller | Feb. 26, 1952 |
| 2,714,294 | Frei | Aug. 2, 1955 |
| 2,769,317 | Strickland | Nov. 6, 1956 |
| 2,808,708 | Sharpe | Oct. 8, 1957 |